INVENTOR.
H. N. FOX
F. N. RUEHLEN

BY *Young and Quigg*

ATTORNEYS

INVENTOR.
H. N. FOX
F. N. RUEHLEN

BY
*Young and Quigg*

ATTORNEYS

United States Patent Office 3,689,382
Patented Sept. 5, 1972

3,689,382
ELECTROCHEMICAL REDUCTIVE COUPLING
Homer N. Fox and Forrest N. Ruehlen, Bartlesville, Okla., assignors to Huyck Corporation, Rensselaer, N.Y.
Continuation-in-part of application Ser. No. 61,771, Aug. 6, 1970, which is a continuation-in-part of application Ser. No. 42,091, June 1, 1970. This application Nov. 23, 1970, Ser. No. 91,922
Int. Cl. C07b 29/06; C07c 121/14
U.S. Cl. 204—73 A
31 Claims

ABSTRACT OF THE DISCLOSURE

Activated substituted olefin reactants are reductively coupled in an electrolytic cell in the presence of a new aqueous mixed salt electrolyte containing cations which decrease the solubility of said reactant in said electrolyte, cations which direct the reductive coupling of said reactant in said electrolyte, anions which do not increase the solubility of said reactant in said electrolyte, and said reactant.

---

Figure 1:
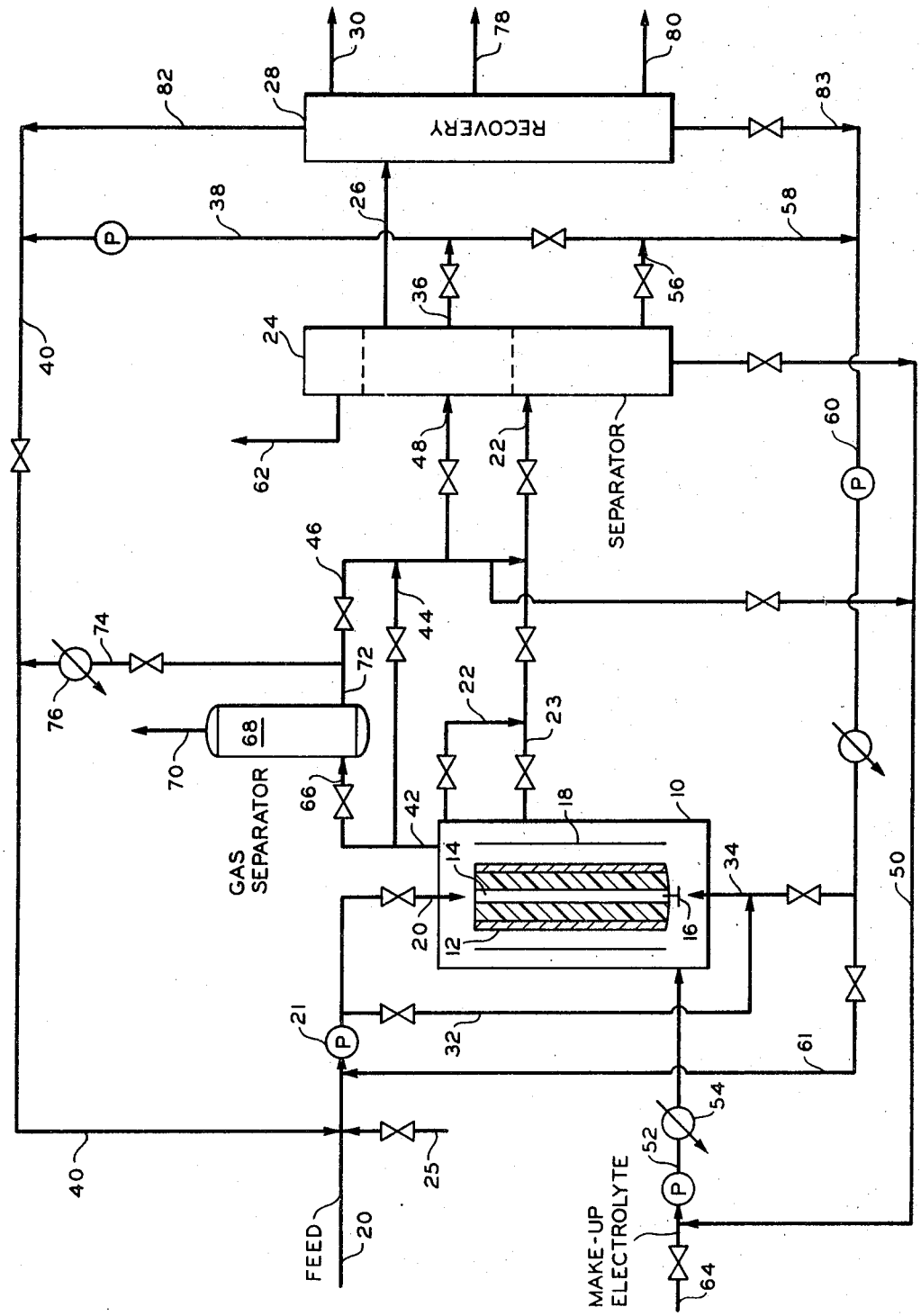

This application is a continuation-in-part of our copending application Ser. No. 61,771, filed Aug. 6, 1970, which in turn is a continuation-in-part of our copending application Ser. No. 42,091, filed June 1, 1970.

This invention relates to the electrochemical reductive coupling of activated substituted olefin reactants.

Herein and in the claims, unless otherwise specified, the term "electrochemical reductive coupling" is employed generically to include hydrodimerization reactions wherein two molecules of the same compound, e.g., acrylonitrile, are coupled, and also mixed couplings wherein molecules of different compounds are coupled, e.g., methacrylonitrile and ethylacrylate.

Generally speaking, reductive coupling processes can be grouped into two groups, (1) electrolytic reduction and coupling, e.g., hydrodimerization, at the cathode of an electrolytic cell with the passage of electrons from an outside power source, and (2) the use of an alkali or alkaline earth metal as a reducing agent. Analgams of alkali or alkaline earth metals have also been used successfully. The present invention relates to the above group (1).

Said processes involving electrolytic reductive coupling at the cathode in an electrolytic cell can also be grouped into two groups. The first group includes those single phase processes wherein the aqueous electrolyte has dissolved therein a large quantity of an organic salt which furnishes cations and/or anions which are capable of increasing the solubility of the reactant olefinic compound in the electrolyte. These processes contain large concentrations of organic cations and organic anions, frequently up to 75 percent by weight, or more. In such processes the solubility of the reactant olefinic compound in the electrolyte is a critical variable. Usually, it is desired that the electrolyte be capable of dissolving at least 10 weight percent, and sometimes as much as 50 weight percent, of the olefinic reactant. The reaction product is also dissolved in said electrolyte. This complicates the process in that large quantities of electrolyte are usually circulated into and out of the cell and to the recovery unit for the recovery of reaction product and unreacted reactant. Since the cell effluent is a single phase mixture of electrolyte salts, water, unconverted feed, and products, it must be subjected to extensive separation operations in order to isolate the products and recycle other materials.

Another disadvantage of such processes is that for best results, and in order to avoid undesirable reactions of the dissolved organic materials at the anode, a divided cell having a cathode compartment and an anode compartment is definitely preferred. Said cathode compartment and said anode compartment are separated by a relatively expensive nonporous permselective cationic diaphragm. The use of such diaphragms complicates cell design and adds significantly to power costs due to the internal electrical resistance they provide. The auxiliary equipment required to handle electrolyte is doubled because of the requirement for separate anolyte and catholyte circulation. The diaphragm becomes dirty, loses its activity, and increases in resistance with time necessitating frequent replacement or regeneration. Furthermore, difficulties are caused whenever said diaphragm becomes ruptured and permits introduction of the acid anolyte into the catholyte in the cathode compartment. This usually results in a drastic drop in chemical yield because the olefinic reactant is converted to addition products and polymers. Contamination of the electrolyte may require that the cell be disassembled and cleaned before it can again be placed in operation. A ruptured diaphragm also leads to loss of olefinic reactant and organic salt due to oxidation at the anode. Anode corrosion in such cells has also been a problem.

The second group of said processes involving electrolytic reduction and coupling at the cathode in an electrolytic cell includes those two phase processes wherein an acidic electrolyte is used in the cell. Aqueous solutions of mineral acids are usually used as electrolyte, although water-soluble metal salts of inorganic acids can be used. In such electrolytes there are only inorganic cations and inorganic anions. In one such process it is required that a film comprising the olefinic reactant be maintained on the face of the cathode. This creates problems in feeding the reactant to the cell in that special feeding equipment and special cathodes are required, or at least preferred. Furthermore, at least potentially, the use of said thin film also creates problems. In the absence of said film, e.g., failure to maintain same or an inadvertent rupture thereof, it is acknowledged that polymer formation occurs and/or undesirable amounts of unwanted by-products are obtained.

These two-phase processes employing aqueous inorganic acids or metal salts of such acids have been found to produce desired products in moderate yields, but only at relatively low current densities. For example, at higher current densities in the typically commercial range of about 135 ma./cm.$^2$, such a process converts acrylonitrile to only minor amounts of adiponitrile and produces major amounts of propionitrile by-product.

The present invention provides a solution for the above-described problems by providing an improved electrolyte, and methods of using said electrolyte, which make it possible to carry out the electrochemical reductive coupling more economically and with greater selectivity than formerly possible. Broadly speaking, the present invention resides in a new aqueous mixed salt electrolyte containing cations which decrease the solubility of the reactant in the electrolyte, cations which direct the reductive coupling of the reactant in the electrolyte, anions which do not significantly increase the solubility of said reactant in the electrolyte and which do not interfere with said reductive coupling, and organic material comprising said reactant; and methods of using said electrolyte in electrochemical reductive coupling processes. In said electrolyte, the concentration of said cations which decrease the solubility of the olefinic reactant in the electrolyte is greater than the concentration of said cations which direct the reductive coupling of said reactant in the electrolyte.

A number of advantages over the processes of the prior art are obtained or realized in the practice of the present invention. For example, the process of the invention is characterized by the use of more conductive electrolytes which results in lower power costs; the elimination of the relatively expensive permselective cationic diaphragm which complicates cell design and increases equipment and operating costs; the use of reduced quantities of expensive components in the electrolyte such as tetraalkylammonium salts of organic acids; improved chemical efficiency and selectivity between the production of desired product and the production of undesired by-products; and simpler and less extensive auxiliary equipment for electrolyte handling and recovery of reaction product and unreacted feedstock.

An object of this invention is to provide a new aqueous mixed salt electrolyte whcih is particularly suitable for use in electrolytic cells employed in electrochemical reductive coupling processes. Another object of this invention is to provide an improved process for the electrochemical reductive coupling of substituted olefin compounds. Still another object of this invention is to provide improved methods of operating electrolytic cells using the new aqueous mixed salt electrolyte described herein, and equipment associated with said cell, for the efficient separation and recovery of unreacted olefinic reactant and reaction product. Another object of the invention is the electrohydrodimerization of olefins which are difficult to dimerize in conventional systems due to poor solubility in the electrolyte. Another object of the invention is to provide an improved electrolytic cell. Other aspects, objects, and advantages of the invention will be apparent to those skilled in the art in view of this disclosure.

Thus according to the invention, there is provided an electrolyte composition, suitable for use in electrochemical processes for the reductive coupling of reactants capable of being reductively coupled to a coupled reaction product, which comprises: water; first cations selected from the group (1) consisting of ions of the alkali metals, ions of the alkaline earth metals, ammonium ions, methyl-substituted ammonium ions, quaternary tetramethylammonium ions, and mixtures thereof, and which are present in a concentration sufficient for said electrolyte to be from 0.1 to 30 normal with respect thereto, based on the aqueous portion of said electrolyte; second cations selected from the group (2) consisting of quaternary tetraalkylammonium ions, quaternary dialkylpiperidinium ions, quaternary dialkylpyrrolidinium ions, quaternary dialkylmorpholinium ions, trialkylsulfonium ions, tetraalkylphosphonium ions, tetraalkylarsonium ions, tetraalkylstibonium ions, quaternary di(alkylene)ammonium ions, and quaternary hexaalkyldiammonium ions having a $C_1$ to $C_5$ alkylene group joining the two nitrogen atoms, and mixtures thereof, wherein each alkyl group is selected from the group consisting of alkyl or cycloalkyl groups containing from 1 to 20 carbon atoms, aryl-substituted, alkenyl-substituted, or mono- or dihydroxyl-substituted alkyl groups containing from 1 to 20 carbon atoms, wherein at least one alkyl group contains at least 2 carbon atoms, and wherein the total of all the carbon atoms in the ion is not more than 40, and which are present in a concentration sufficient for said electrolyte to be from 0.0001 to 1 normal with respect thereto, based on the aqueous portion of said electrolyte; anions which do not significantly increase the solubility of said reactant in said electrolyte; from 2 to 12 weight percent of said reactant or said reactant and said product; and wherein the normality ratio of said group (1) cations to said group (2) cations is at least 1.5. Said electrolyte can preferably contain from 2.5 to 10, more preferably from about 3 to about 7, weight percent of said reactant or said reactant and said product.

Further according to the invention, there is provided a process for the electrolytic reductive coupling of activated substituted olefin reactants capable of being reductively coupled to a coupled reaction product in the presence of an aqueous electrolyte contained in a cell provided with a cathode and an anode, which process comprises: passing a direct electric current through an aqueous mixed salt electrolyte containing water, first cations which decreases the solubility of said reactant in said electrolyte, second cations which direct the reductive coupling of said reactant in said electrolyte, all of said cations being stable to decomposition at said cathode or said anode, anions which do not significantly increase the solubility of said reactant in said electrolyte and which do not interfere with said reductive coupling, and from 2 to 12 weight percent of said reactant or said reactant and said product; and during said passage of said electric current, converting at least a portion of said reactant to said reaction product.

Still further according to the invention there is provided an improved electrolytic cell comprising: a first support member; a second support member joined to said first support member forming a passageway therebetween; a cathode member joined to an inner surface of said first support member and extending along said passageway; an anode member joined to an inner surface of said second support member and extending along said passageway opposite said anode member; an inlet conduit means extending into communication with said passageway for introducing a reactant into said passageway; an outlet conduit means extending into communication with said passageway, at a point spaced apart from said inlet means, for withdrawing a product from said passageway; means for connecting said anode member to a source of electric current; and means for connecting said cathode member to a source of electric current.

As used herein and in the claims, unless otherwise specified, the term "electrolyte" is employed generically to refer to the solution, mixture, or emulsion which is subjected to the action of the electric current between the cathode and the anode. Thus, the electrolyte systems of the invention can be either one-phase systems or two-phase systems.

Said one-phase systems comprise an aqueous phase wherein the water will have said first cations and said second cations in solution therein. Said reactants, or said reactant and said product during operation, will also be in solution in said aqueous phase in amount up to the solubility thereof, usually less than about 5 weight percent.

Said two-phase systems comprise an aqueous phase and an organic phase, and include two types: (1) an aqueous phase as defined above, and a separate organic phase comprising said reactant or said reactant and said product which is passed through said aqueous phase between the electrodes; and (2) an emulsion of an aqueous phase as defined above and an organic phase as defined above which is passed between the electrodes.

The invention is applicable to the electrochemical reductive coupling of any activated substituted olefin compound capable of being reductively coupled electrochemically. An example of applicable feedstocks include, among others, the following, and the like:

nitrile represented by the formula

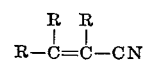

wherein: preferably, each R is hydrogen or an alkyl group containing from 1 to 5 carbon atoms. However, since the invention is not limited by the solubility of the olefinic reactant in the electrolyte, it is within the scope of the invention for said alkyl groups to contain more than five carbon atoms, e.g., up to ten carbon atoms. To be useful in the practice of the invention, said feedstocks should be relatively insoluble, e.g., less than about 5 weight percent, in the aqueous mixed salt electrolyte system of the invention at the cell operating conditions. Thus, in instances where the solubility of the feedstock in said electrolyte may exceed about 5 weight percent under one set of conditions, it is within the scope of the invention to decrease the cell operating temperature, and/or adjust other cell operating conditions, so as to control and/or adjust said solubility. The advantages of low solubility of the feed-stock in the electrolyte include a marked decrease in the amount of oxidation of feedstock and product, improved conductivity of the electrolyte with resultant lower power costs, elimination of the need for a permselective cationic diaphragm in the cell, and increased overall efficiency.

Some examples of applicable feedstocks together with their reductive coupling products, are shown in the table below:

| Substituted olefin | Reductive coupling product |
| --- | --- |
| Acrylonitrile | Adiponitrile. |
| Methacrylonitrile | 2,5-dimethyladiponitrile. |
| 2-pentenenitrile | 3,4-diethyladiponitrile. |

The invention is particularly applicable to the electrochemical reductive coupling of aliphatic alpha,beta-olefinic compounds. For example, the conversion of compounds such as acrylonitrile to compounds such as adiponitrile. Thus, because of the commercial interest in the reaction of acrylonitrile to adiponitrile, and because of the outstanding unexpected results obtained with said reaction, but not by way of limitation, the invention will be described in many instances herein with particular reference to the conversion of acrylonitrile to adiponitrile.

The cations in the electrolyte system of the invention are those cations, of water-soluble salts, which are stable in the electrolyte, e.g., they do not decompose in aqueous solution and do not decompose at the cathode under the electrolysis conditions used. Said cations are of two types or groups, (1) those which decrease the solubility of the olefinic reactant in said electrolyte, and (2) those which direct the reductive coupling of the olefinic reactant in said electrolyte. For the purposes of this invention, said cations of Type (1) can also be referred to as conducting cations since, in addition to the important purpose of decreasing the solubility of the olefinic reactant in the electrolyte, they are highly mobile in electrolytic solutions and can be used in amounts sufficient to greatly increase the conductivity of said electrolyte. Cations of Type (2) are referred to as directing cations since they apparently have the property of selectively directing the reaction toward the desired product and away from undesired by-products. For example, in the reaction of acrylonitrile to adiponitrile, it was surprising and unexpected to find that small concentrations of quaternary tetraalkylammonium ions wherein the alkyl groups contain at least two carbon atoms greatly increased the selectivity of the reaction to the desired adiponitrile product rather than to undesired by-products such as propionitrile, even though they were present in quantities too small to provide substantial conductivity or substantial acrylonitrile solubility in the electrolyte.

Examples of said first or Type (1) cations include: ions of the alkali metals such as sodium, potassium rubidium, cesium, and lithium; ions of the alkaline earth metals such as magnesium, calcium, strontium, and barium; ammonium ions; methyl-substituted ammonium ions such as trimethylammonium, dimethylammonium, and methylammonium; and quaternary tetramethylammonium ion. The ions of the alkali metals are presently preferred, with the ions of sodium and potassium being most preferred because of their ready availability and low cost.

Examples of said second or Type (2) cations have been named above. In some instances, it is preferred that the alkyl groups in said second or Type (2) cations contain from 2 to 5 carbon atoms, and that said hydroxyl-substituted alkyl groups contain from 1 to 5 carbon atoms. The quaternary tetraalkylammonium ions are included among the presently preferred Type (2) cations. Quaternary tetrabutylammonium ion is one of the presently more preferred Type (2) cations.

The presently preferred Type (2) cations can be represented by the formula

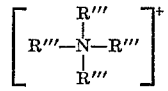

wherein each R''' is selected from alkyl radicals, cycloalkyl radicals, alkenyl radicals, aralkyl radicals, and monohydroxy-substituted alkyl radicals having from 1 to about 20 carbon atoms per radical, at least one R''' being an alkyl radical having at least 2 carbon atoms, and wherein the total number of carbon atoms in all the R''' radicals is not more than about 40.

A still more preferred group of cations within the above class is one wherein at least one R''' radical of the cation is an alkyl radical having at least 4 carbon atoms and the sum of all carbon atoms in all the R''' radicals is at least 11. In some instances it is more preferred that said R''' radicals contain a total of at least 11 but not more than 16 carbon atoms.

Examples of said Type (2) cations which can be used in the practice of the invention include among others, the following:

tetraamylammonium
tetra(2-ethylhexyl)ammonium
tetradecylammonium
trimethyloctylammonium
dibutyldiisobutylammonium
dipropyldibutylammonium
methylethylpropylbutylammonium
4-hydroxybutyltrimethylammonium
8-hydroxyoctyltributylammonium
tri(10-hydroxydecyl)methylammonium
N,N,N,N',N',N'-hexaethylethylenediammonium
N,N-dibutylpiperidinium
N,N-di(3-methylheptyl)piperidinium
N,N-didecylpyrrolidinium
N-(4-hydroxybutyl)-N-ethylpyrrolidinium
N,N-dipropylmorpholinium
N,N-dioctylmorpholinium
tributylsulfonium
triethylsulfonium
tetrabutylphosphonium
tetrahexylarsonium
tetranonylstibonium
tetrapropylammonium
tetraethylammonium
tetrabutylammonium
diethyldistearylammonium
triethyllaurylammonium
tripropylmyristylammonium
methyldibutylcetylammonium
hexamethylenebis(octyldimethylammonium)
hexamethylenebis(trimethylammonium)
6-hydroxyhexyltrimethylammonium
butyldimethylbenzylammonium
tributylcyclohexylammonium
dibutylmethylallylammonium
di(pentamethylene)ammonium and the like, and mixtures thereof.

In the practice of the invention, said Type (1) cations can be used in the electrolyte systems of the invention in concentration within the range of from 0.1 to 30, preferably 0.1 to 3, more preferably 0.5 to 2, normal, depending upon the solubility of the Type (1) cation-containing salt. Said Type (2) cations can be used in the electrolyte systems of the invention in varying concentrations depending upon the particular mode of operation employed in practicing the method of the invention. Thus, the preferred concentration of said Type (2) cations for one mode of operation can be different from that for another mode of operation. For example, when passing the olefinic reactant through a body of aqueous electrolyte between a cathode and an anode in a cell, said Type (2) cations can be used in the electrolyte systems of the invention in concentrations within the range of from 0.01 to 1, preferably 0.05 to 0.5, normal; and the normality ratio of said Type (1) cations to said Type (2) cations can be in the range of from 1.5 to 50, preferably 5 to 25. When passing the olefinic reactant between the cathode and the anode in emulsified form, the concentration of said Type (2) cations in the aqueous phase of the electrolyte can be in the range of from 0.0001 to 1, preferably 0.001 to 0.01 normal; and the normality ratio of said Type (1) cations to said Type (2) cations can be in the range of from 1.5 to 30,000. In all instances, the concentration of said Type (1) cations is greater than the concentration of said Type (2) cations, and said normality ratio is at least 1.5.

Thus, an overall range for the concentration of said Type (2) cations in the aqueous portion or phase of the electrolyte systems of the invention can be from 0.0001 to 1 normal; and the normality ratio of said Type (1) cations to said Type (2) cations can be in the range of from 1.5 to 30,000, preferably 5 to 3,000.

During operations of the cell, the Type (2) cations are distributed between the aqueous phase and the organic phase of the electrolyte. The distribution of the Type (2) cations between said two phases is affected by the concentration of the Type (1) cations in the aqueous phase and the volume ratio of the two phases. This can cause the concentration of the Type (2) cations to be greater in the organic phase than in the aqueous phase, although a substantial proportion of the total quantity of Type (2) cation can be located in the aqueous phase because of the large amount of aqueous phase usually present. For this reason, a frequently convenient way of expressing the above-referred-to concentrations, particularly in emulsion systems, is to base same on the total electrolyte system, i.e., the total cell contents or recirculating mixture. This can be done by determining the total amounts of each salt component in the system without regard to their distribution in the two phases, and maintaining the ratio of the Type (1) cations to the Type (2) cations within the desired range. Said ratio can be readily maintained or controlled by adding sufficient make-up or recycle Type (2) cations to the cell feed stream, or at any point in the circulating system, to maintain the concentration of the Type (2) cations in the cell effluent stream within the desired range. In this system of control said concentrations and said ratio can be expressed as follows: normality of Type (1) cations in the cell effluent stream within the range of from 0.1 to 30, preferably 0.1 to 3, more preferably 0.5 to 2, based on the aqueous phase; normality of Type (2) cations in the cell effluent stream within the range of from 0.001 to 0.3, preferably 0.01 to 0.05, based on the organic phase; and the normality ratio of Type (1) cations to Type (2) cations within the total two-phase system, at least 1.5, preferably within the range of from 1.5 to 30,000, more preferably 5 to 3,000. In many instances, said normality ratio will preferably be at least 200 based on the total electrolyte system, e.g., in the range of 200 to 3,000.

In operation, it is frequently convenient to control the system on the basis of concentration of the Type (2) cations in the cell effluent stream and to express said concentration in terms of weight percent. On this basis, the concentration of the Type (2) cations will generally be within the range of from 0.05 to 12, preferably 0.05 to 2, weight percent of the organic phase. Once the system is in operation, a simple very effective control can be obtained by merely adding sufficient make-up or recycle Type (2) cations to the system to maintain the concentration of said cations in the cell effluent stream within the range of from 0.05 to 12, preferably 0.05 to 2, weight percent of the organic phase and only occasionally checking the concentrations in the aqueous phase.

In all instances, regardless of how said concentrations are determined or expressed, the concentration of said Type (1) cations is greater than the concentration of said Type (2) cations, and the normality ratio of said Type (1) cations to said Type (2) cations is at least 1.5. Said ratio is an important control variable in the practice of the invention.

While the Type (1) cation will generally remain substantially in the aqueous phase, the distribution of the Type (2) cation in the total system will depend upon the relative size of the aqueous and organic phases. With more organic phase present, the greater will be the quantity of Type (2) cation in that phase. Similarly, with more aqueous phase present, the greater will be the quantity of Type (2) cation in the aqueous phase. In ordinary operation, the quantity of aqueous phase is much greater and, hence, much, if not most, of the Type (2) cation can be contained therein.

The anions which can be used in the electrolyte system of the invention are those which are stable in aqueous solution, which form soluble salts with the above-described cations of the electrolyte system, and which do not substantially or significantly contribute to the solubility of the feedstock in the electrolyte. Preferably, said anions will not be discharged at the anode of the cell under the electrolysis conditions used. However, such discharge can frequently be tolerated, depending upon the specific anion.

Examples of said anions include the various phosphates such as trivalent phosphate, divalent hydrogen phosphate, and monovalent dihydrogen phosphate; sulfate and hydrogen sulfate; fluoride, chloride, and bromide; tetrafluoroborate; acetate; benzoate; silicate; nitrate; cyanide; hydroxyl; sulfide; chlorate; and the like.

In addition to the anions which do not significantly increase the solubility of the organic reactants in the aqueous electrolyte and which are relatively stable and which do not interfere with the reductive coupling reaction, still other anions can be present in minor amounts. Thus, other anions which, if present in major quantities, would be intolerable in the present process, can be tolerated if they are present in only very small proportions. This is merely for the sake of convenience, however, and relatively large, highly organic anions, such as alkylsulfonate or alkylsulfate ions, are not desirable in the present process and should ordinarily be avoided.

As mentioned earlier, the present invention requires the use of a specific class of Type (2) cations to function most effectively. Sometimes, the conveniently available salts which contain these cations may not always contain the most preferred anions. Since in most applications, however, the quantity of the salt containing a group (2) cation being introduced into the operation is extremely small in comparison with the quantity of salt containing a Type (1) cation, the anion which accompanies the Type (2) cation can easily be tolerated, no matter what its nature. As a specific example, a satisfactory aqueous electrolyte system can be one which is about 1.5 normal in sodium and phosphate ions and which is about 0.004 normal in tributylethylammonium and ethylsulfate ions.

Thus, other anions which can be introduced into the system in small quantities are, for example: methylsulfate; ethylsulfate; m-toluenesulfonate; p-cumenesulfonate; p-xylene - 2-sulfonate; benzenephosphonate; thiocyanate; adipate; bicarbonate; octoate; and the like, and mixture thereof.

In some instances, the olefinic reactant may be subject to polymerization or other side reactions, depending upon the pH of the electrolyte. Thus, in order to minimize polymer formation, simple reduction of the olefinic bond, and other side reactions, it is desirable to maintain the pH of the electrolyte within the range of about 6 to 12, preferably about 6 to about 8. The pH can be controlled, for example, by adding phosphoric acid, particularly when phosphate ions are already present, or by adding sodium hydroxide, particularly when sodium ions are already present. However, in the normal practical operation of the invention, reactions at the cathode or the anode which affect the bulk pH of the electrolyte are very minor and adjustments for pH are seldom necessary.

It is a feature of the present invention that under normal operating conditions there is very little, if any, tendency toward polymer formation. Thus, the use of polymerization inhibitors is usually not necessary. However, with some olefinic feedstocks, and under some operating conditions, the use of a polymerization inhibitor may be desirable. In such instances, the use of a polymerization inhibitor is within the scope of the invention. Any suitable inhibitor known to the art for inhibiting free radical polymerization can be used. Examples of such inhibitors include, among others, quinone, hydroquinone, p-t-butyl-catechol, di-t-butylhydroquinone, chloranil, etc. Said inhibitors can ordinarily be used in small amounts, e.g., less than 1 weight percent based on the olefinic feedstock. Frequently, quantities as small as 0.01 weight percent can be used. Larger amounts such as up to about 5 weight percent can be used if necessary.

The cell operating temperature employed in the practice of the invention can vary over a relatively wide range of from about 40 to about 200° F., and higher under pressure, depending to some extent upon the particular feedstock and the electrolyte composition. Generally speaking, it is preferred to operate at temperatures within the range of about 90 to about 150° F. Higher temperatures sometimes promote formation of undesirable by-products. At lower temperatures the cell voltage required is generally somewhat higher.

The electric current supplied to the cell will vary with the type of electrodes employed, the nature and amount of the electrolyte, and the cell operating temperature. Generally speaking, said current will be supplied at a rate greater than 0.5 ampere, and at a current density within the range of from about 10 to about 1000, preferably about 50 to about 400 amp per geometric square foot of cathode surface. For reasons of economy, there is an optimum current density which depends primarily on the conductivity of the electrolyte. Higher current densities minimize the cost of the cell, but lower current densities minimize power consumption, thus power costs. When the current density is too high for a given cell system, the formation of undesirable by-products can occur. For example, when acrylonitrile is the feedstock, an excessively high current density will tend to increase the production of undesirable propionitrile and hydrogen will be evolved. The current will be supplied at a cell voltage sufficient to cause development of the cathode half-cell potential required for the electrochemical reductive coupling to occur. Usually, said cell voltage will be within the range of from about 2 to about 10 volts.

The feed rate of the olefinic feedstock to the cell, in itself, is not a critical parameter in the operation of the cell, Said feed rate will ordinarily be adjusted in accordance with the other operating conditions employed. For example, for a given current density, the feed rate will be that sufficient to maintain the desired level of conversion of olefinic reactant. In the practice of the invention, the olefinic reactant is flowed through the cell between the cathode and the anode. Depending upon cell construction, e.g., spacing between electrodes, it may be desirable to introduce the feedstock into the cell in the immediate vicinity of the surface of the cathode. In one presently preferred embodiment of the invention, described hereinafter, at least a portion of the organic effluent from the cell, as an emulsion or as a separate phase, is recycled through the cell until the desired level of conversion, based on fresh feedstock, is obtained. Thus, as a guide to those skilled in the art, but not by way of limitation of the invention, the fresh feed rate can be within the range of from about 0.005 to about 2.5 pound mols per hour per square foot of cathode surface when operating at a conversion level of about 3 to about 50 percent per pass through the cell.

In those embodiments of the invention wherein recirculation of the organic phase effluent from the cell, as an emulsion or as a separate phase, back to the cell is employed, the recirculation rate can be in the range of about 0.005 to about 7.5 pound mols per hour per geometric square foot of cathode surface. It will be understood that the olefinic fresh feed rate given above is included in said recirculation rate. When a portion of the cell effluent is diverted to a product recovery zone (described below), the recirculation rate, the current density, the fresh feed rate, and the rate of cell effluent diverted will ordinarily be such that the overall conversion of the feedstock will be in the range of from about 10 to about 90 percent, preferably about 25 to about 80 percent, more preferably about 40 to about 80 percent. In those embodiments of the invention wherein electrolyte is withdrawn from and recirculated to the cell, the volume ratio of electrolyte recirculated to organic phase will ordinarily be within the range of about 1 to about 50, or higher.

In all embodiments of the invention, the velocity of the feedstock-containing stream flowing between the electrodes will preferably be sufficient to prevent or inhibit the formation of a film of organic material on the surface of the cathode. Turbulent flow in the region between said electrodes is usually preferred because this aids in preventing or inhibiting formation of said film. However, it is within the scope of the invention to employ laminar or streamline flow. The presently preferred linear velocity of liquid passing over the cathode surface is in the range of from about 0.05 to about 6 feet per second.

Any suitable cell configuration comprising any suitable type of container, any suitable type and configuration of cathode, and any suitable type and configuration of anode, can be employed in the practice of the invention. Generally speaking, the cell can comprise any suitable type of container fabricated from any suitable material which is compatible with the electrolyte, and which is provided with suitable inlets and outlets for the introduction and removal of the cell contents. Glass and plastic coated or lined steel are examples of two materials which can be employed. Broadly speaking, the cathode and the anode can be of any suitable conductive material which is compatible with the electrolyte and is not attacked or corroded, or only slowly corroded, under the operating conditions normally employed in the cell. Preferred materials for the cathode are those having a fairly high hydrogen overvoltage, e.g., a hydrogen overvoltage greater than that of copper. Examples of such materials include, among others, lead, graphite, nickel, silver, gold, lead alloys, etc. Examples of materials suitable for use as the anode include, for example, lead, lead alloys, platinum, gold, nickel, etc.

After extended operation, or because of "poisoning" by the presence of minute quantities of deleterious materials in the feeds, the electrodes can sometimes require a cleaning such as by washing, scraping, polishing, or other such means to restore their surfaces for efficient operation.

Figure 4:
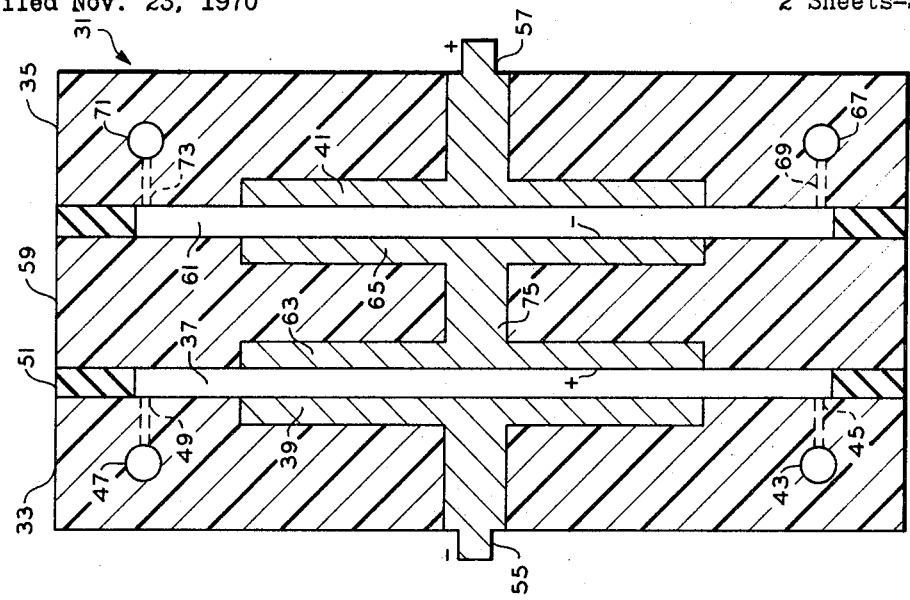
Figure 3:
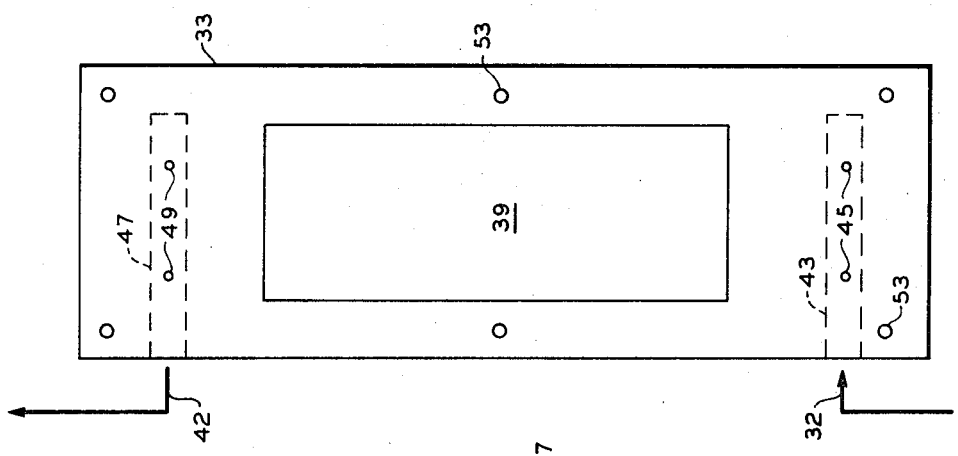
Figure 2:
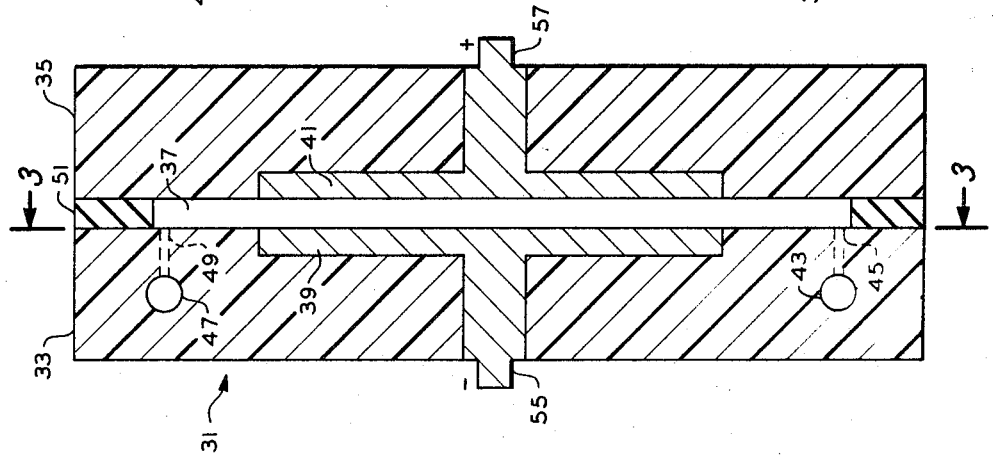

FIG. 1 is a diagrammatic flow sheet illustrating several embodiments of the invention. It will be understood that in the drawings many valves, pumps, control instruments, separating equipment, etc., not necessary for the explanation of the invention have been omitted for brevity. FIG. 2 is a cross section of one type of cell which can be employed in the practice of the invention. FIG. 3 is a view taken along the line 3—3 of FIG. 2 and showing one-half of the cell illustrated in FIG. 2. FIG. 4 is a view in cross section of a "double" or bipolar cell embodying the principles of the cell illustrated in FIGS. 2 and 3. Referring now to the drawings, the invention will be more fully explained.

In FIG. 1, there is illustrated a cell comprising a suitable container 10, a cathode 12, and an anode 18. As here illustrated, said cathode comprises a lead sheet wrapped around a nonconducting, generally cylindrical core. A feed tube 14 extends down through said core and terminates in a porous plastic sparger 16 located just below the rounded bottom of said core. Said cathode can be rectangular or square if desired. Also, if desired, said feed tube 14 can be omitted and the feed introduced at the bottom of the cathode through a sparger connected to conduit 34, as described below. As here illustrated, anode 18 comprises a circular sheet of lead surrounding the cathode. Said anode and said cathode are each connected to a source of direct current by lead wires, not shown. Generally speaking, it is desirable that the spacing between the cathode and the anode be relatively small, e.g., about ½ inch, or less, so as to reduce power costs. In one type of cell the cathode and anode can comprise rectangular sheets of lead spaced apart from each other and supported on their outer surfaces with suitable supports. In such cells, essentially the only internal space within the cell is that between the cathode and the anode. It is a feature of the present invention that no cell divider, such as a permselective membrane or diaphragm, is required. While not illustrated in the drawings, it may sometimes be desirable to employ a porous nonselective divider or membrane between the electrodes. Any suitable type, e.g., asbestos, porous alundum, etc., which will permit passage of the electrolyte but will keep the gaseous anode products separate from the cathode products can be employed.

Referring to FIG. 2, there is shown an electrolytic cell, designated generally by the reference numeral 31, comprising a first support member 33 and a second support member 35. Said second support member is joined to said first support member and forms a passageway 37 therebetween. Said first and second support members can be fabricated from any suitable nonconducting material, for example, polyethylene, polypropylene, Teflon, etc.

A cathode member 39 is joined to an inner surface of said first support member 33 and extends along said passageway 37. An anode member 41 is joined to an inner surface of said second support member 35 and extends along said passageway opposite said anode member 39. Preferably, said cathode member and said anode member are of substantially the same length and extend only partially along said passageway. If desired, said cathode member 39 and said anode member 41 can be mounted on said inner surfaces of said first and second support members, respectively, and extend out into said passageway 37. However, it is preferred that said cathode member and said anode member be recessed in or mounted in said support members with the surfaces of said cathode member and said anode member flush with the respective inner surfaces of said support members.

An inlet conduit means comprising a primary conduit 43 and at least one secondary conduit 45 extends into communication with said passageway 37 for introducing a reactant into said passageway, e.g., one end portion thereof, and passing said reactant between cathode 39 and anode 41. An outlet conduit means comprising a primary conduit 47 and at least one secondary conduit 49 extends into communication with said passageway 37, at a point spaced apart from said inlet means, for withdrawing a product from said passageway, e.g., the other end portion thereof. While said inlet conduit means and said outlet conduit means are illustrated as being disposed in said first support member, it is within the scope of the invention for one or the other, or both, to be disposed in said second support member. A gasket 51 is provided between said support members when they are joined and the width of said passageway 37 is substantially the same as the thickness of said gasket. If desired, a spacer element (not shown) can be provided at the ends of said passageway 37 with suitable gasket members on each side thereof. Preferably, said passageway will be of minimum width, e.g., ⅟₁₆ to ½ inch, so as to reduce power costs. Said secondary conduits 45 and 49 are preferably positioned adjacent opposite ends of said passageway 37 and in close proximity to said gasket 51. This feature is desirable so as to provide maximum utilization of said passageway 37 and to minimize the formation of eddy currents in the end portions of said passageway 37. While said cathode member 39 and said anode member 41 preferably extend only partially along said passageway 37, as shown, it is within the scope of the invention for said cathode member and said anode member to extend substantially the entire length of said passageway. A plurality of bolt holes 53 are provided around the periphery of each of said support members for joining the same together by means of bolts. Any other suitable means, e.g., band clamps, can be employed for holding said support members together. Members 55 and 57 are provided for electrically connecting said cathode member 39 and said anode member 41, respectively, to a source of electric current. Preferably, said members 55 and 57 are integrally connected to said cathode 37 and said anode 41, as shown. Any other suitable means can be employed for connecting said electrodes to the source of current.

Referring now to FIG. 4, there is shown a "double" or bipolar cell, designated generally by the reference number 31', and embodying the principles of the cell illustrated in FIGS. 2 and 3. In the cell of FIG. 4 an intermediate support member 59 is provided between said first support member 33 and said second support member 35 when they are joined. Said passageway 37 becomes a first passageway between said first support member 33 and said intermediate support member 59. A second passageway 61 is formed between said intermediate support member 59 and said second support member 35.

An anode member 63 is joined to an inner surface of said intermediate support member 59 and extends along said first passageway 37 opposite said cathode member 39 which is joined to said first support member 33. A cathode member 65 is joined to the opposite inner surface of said intermediate support member 59 and extends along said second passageway opposite said anode member 41 which is joined to said second support member 35.

Said inlet conduit means 43 and 45 extend into said first support member 33 and into communication with said first passageway 37. A second inlet conduit means comprising a primary conduit 67 and a secondary conduit 69 extends into said second support member 35 and into communication with said second passageway 61. Said outlet conduit means 47 and 49 extends into said first support member 33 and into communication with said first passageway 37. A second outlet conduit means comprising a primary conduit 71 and a secondary conduit 73 extends into said second support member 35 and into communication with said second passageway 61. Connecting means 75 is provided for electrically connecting said anode member 63 and said cathode member 65 which are joined to opposite surfaces of said intermediate support member 59.

While the cells of FIGS. 2–4 have been illustrated in the shape of elongated rectangles, it is within the scope of the invention for said cells to be substantially square, or any other suitable shape. If desired, said inlet and outlet conduit means can comprise only a primary conduit, e.g., 43 or 47, which communicates directly with the passageway, e.g., 37. Said cathode and anode members can be fabricated of any suitable conducting materials depending upon the process to be carried out in the cell.

Referring to FIG. 1, in one embodiment of the invention, in a simple once-through operation, with current flowing between the electrodes, fresh olefinic reactant feedstock is introduced via conduit 20, passed through feed passageway 14, and introduced into the electrolyte through sparger 16. Said electrolyte can be prepared initially to contain organic material comprising said reactant in an amount within the above-stated ranges. Alternatively, organic material comprising said reactant and said reaction product can be introduced into the base electrolyte during operation of the cell. Said feedstock passes upwardly through the electrolyte in liquid phase between cathode 12 and anode 18 and at least a portion thereof is converted to reaction product. An organic supernatant layer comprising any unreacted feedstock and reaction product is withdrawn from the cell via conduit 22, and passed to separation zone 24 wherein a separation between the organic phase and any entrained electrolyte takes place. An organic layer is withdrawn from said separator 24 via conduit 26 and introduced into recovery zone 28. Said recovery zone can comprise any suitable method and means such as fractional distillation, crystallization, extraction, etc., known to the art for effecting the desired separation and recovery. Reductive coupling product can be withdrawn from said recovery zone via conduit 30. If desired, said fresh feedstock can be passed via conduits 32 and 34 into the bottom of the cell below cathode 12 through a suitable sparger, not shown. In at least one preferred embodiment, said feedstock is introduced in the form of finely divided droplets or globules for purposes of even distribution in the region between the cathode and the anode.

In a more preferred embodiment of the invention, a portion of the organic phase in separator 24 is withdrawn therefrom via conduit 36 and passed via conduits 38 and 40 to conduit 20 for recycle through the cell so as to increase the level of conversion by converting more of the unreacted feedstock contained therein.

While not shown in the drawing, said cell can be provided with an internal cooling coil through which a suitable coolant, e.g., water, can be circulated for controlling the temperature of the cell contents. However, in one more preferred embodiment of the invention, the cell is operated liquid-full and a mixed phase or emulsion comprising organic materials and electrolyte can be withdrawn from the cell via conduit 42 and passed via conduits 44 and 46 to either conduit 48 or conduit 22 for introduction into said separator 24. A small portion of the organic phase is withdrawn from separator 24 and passed via conduit 26 to recovery zone 28 as previously described. A larger portion of said organic phase is withdrawn from separation zone 24 via conduit 36 and passed via conduits 38 and 40 for recycle to the cell as previously described. Aqueous phase comprising electrolyte can be withdrawn from separator 24 via conduit 50 and, passed to conduit 52, through cooler 54, and introduced into the cell 10 for controlling the temperature of the cell contents.

In another embodiment of the invention, said aqueous phase can be withdrawn from separator 24 via conduit 56 and passed via conduits 58 and 60 into conduit 34 for recycle to the cell. In this embodiment of the invention, if desired, the fresh feed from conduit 20, and the recycle organic phase from conduit 40, can be passed via conduit 32 and combined with said aqueous phase from conduit 60 in conduit 34.

In all the above-described embodiments of the invention, gaseous cell products can be withdrawn from the upper portion of separation zone 24 via conduit 62. Also, in all the above-described embodiments of the invention make-up water and electrolyte salts can be added to the system via conduit 64.

In one presently more preferred embodiment of the invention, a mixed phase or emulsion comprising organic materials and aqueous electrolyte is withdrawn from the cell via conduits 42 and 66 and introduced into gas disengaging or separation zone 68. Gaseous cell products are vented via conduit 70. Liquid cell effluent is withdrawn from gas disengaging zone 68 via conduit 72 with a small portion thereof, e.g., about 10 to 25 percent, being passed via conduit 46 into either conduit 48 or conduit 22 for introduction into separation zone 24. The remainder or larger portion of the liquid cell effluent is passed via conduit 74 and cooler 76 for introduction into conduit 40 and recycle to the cell as previously described. This has the advantage of reducing the load on the recovery unit. Fresh olefinic reactant feedstock is added from conduit 20 in an amount sufficient to compensate for the reaction product(s) and unreacted olefinic reactant contained in that portion of the cell effluent passed through conduit 46. In this embodiment of the invention, and other embodiments where applicable, the organic phase in conduit 26 is passed into recovery zone 28 for recovery of reaction product via conduit 30, recovery of lower boiling impurities via conduit 78 and higher boiling impurities via conduit 80. Unreacted olefin reactant can be removed from said recovery zone via conduit 82 and passed to conduit 40 for recycle to the cell as previously described. In this embodiment of the invention, and other embodiments where applicable, a portion of the organic salt in the electrolyte, such as tetrabutylammonium phosphate, will be extracted from the electrolyte with the organic phase and dissolved therein. Said organic salt can be recovered in recovery zone 28 and removed therefrom via conduit 83 for passage to conduits 60 and 34 for recycle to the cell.

In another less preferred embodiment of the invention, a phase separation can be permitted to occur in the cell with an organic phase comprising unreacted olefin reactant and reaction product being withdrawn from the cell via conduit 42 (or 22) and passed via conduits 44, 46, and 48 (or 22) to separator 24. A separate aqueous phase can be withdrawn from the cell via conduit 23 and passed to said separation zone 24. The organic phase and aqueous phase can then be handled in one of the manners described herein.

In another embodiment of the invention, aqueous phase can be withdrawn from separator 24 via conduit 56, organic phase can be withdrawn from separator 24 via conduit 36, said two phases can then be combined in conduit 38, or in conduit 58, and passed to conduit 40, or conduit 60, for recycle of the combined stream to the cell. In this embodiment of the invention, said organic phase and said aqueous phase can be emulsified, if desired, by the pump in conduit 38 and/or the pump in conduit 20, or the pump in conduit 60. Said emulsions are preferably weak or temporary emulsions. In some instances these emulsions can provide more uniform distribution of the feed in the cell.

The use of emulsions is preferred in some embodiments of the invention, particularly when employing cells of the type illustrated in FIGS. 2–4 described above. Thus, in a modification of the embodiment described above wherein a mixed phase or emulsion is withdrawn from the cell via conduits 42 and 66, cell 31 or 31' can be substituted for cell 10. The recycle cell effluent from conduit 40 is passed into conduit 20, through pump 21 where the fresh feed from conduit 20 is emulsified with said recycle stream, and then into conduit 32 for introduction into feed passageway 37 of cell 31 as indicated in FIG. 3. The resulting emulsion is then passed through the cell between cathode 39 and anode 41 as described above in connection with FIGS. 1 to 4. Cell effluent is withdrawn from passageway 37 via conduit 42 as indicated in FIG. 3. Make-up electrolyte or electrolyte salts can be added to the system via conduit 25, initially when starting up the system or during operation thereof. If desired, aqueous phase and/or organic phase from separator 24 can also be recycled to conduit 20 via conduits 36, 56, 58, 60, and 61. Organic salt can also be withdrawn from recovery zone 28 via conduit 83 and passed into conduit 60 for recycle to the cell via conduit 61. In starting a cell a fresh emulsion of aqueous electrolyte and olefinic reactant can be introduced via conduit 20 or 32.

Preferably, water is the continuous phase in said emulsions. However, it is within the scope of the invention for the organic phase to be the continuous phase. In said emulsions, said organic phase will usually comprise about 2 to 12, preferably about 2.5 to 10, more preferably about 3 to about 7, weight percent of the total emulsion. The amount of olefinic reactant in said organic phase will depend upon the conversion level. Thus, in a circulating system wherein said emulsion is being recirculated through the cell with a portion of the circulating system being removed for product recovery, and the desired conversion level is 50 percent, the olefinic reactant in said emulsion will be about 50 weight percent of the organic phase.

If desired, emulsifying agents can be used in the practice of the invention. Said emulsifying agents can be added to the system via conduit 25, conduit 64, or elsewhere. Also, de-emulsifying agents can be used in separation zone 24. The use of said emulsifying and/or de-emulsifying agents is not essential and is an optional feature of the invention. Any suitable such agents known to the art can be used.

In another embodiment of the invention, a single-phase electrolyte in accordance with the invention is introduced into a cell, preferably like cell 31 or 31', via conduit 32. A cell effluent stream is withdrawn via conduit 42, cooled by any suitable means (not shown) to a temperature sufficient to cause a phase separation of the organic material contained therein, and then introduced into phase separation zone 24. If desired, the cooling of said cell effluent stream can be effected in phase separator 24. Said cell effluent can be cooled to any suitable temperature sufficient to effect the desired phase separation. Usually, a temperature within the range of 10 to 50, preferably 10 to 25° F., below the cell operating temperature will be sufficient. The resulting organic phase and aqueous phase can then be withdrawn from separation zone 24 for recovery of reaction product and/or recycle to the cell as described above. In recycling said organic phase and said aqueous phase to the cell, with or without the addition of fresh reactant thereto, the stream(s) charged to the cell through conduit 32 can be heated if desired or necessary to effect solution of the organic material and form a single-phase electrolyte. It is also within the scope of the invention to extract the cell effluent stream with a suitable selective solvent, e.g., methylene chloride, to extract the organic materials therefrom. Said extraction can be carried out in conventional manner with recovery of the organic materials, e.g., reaction product and any unreacted reactant from the extract, and recovery of the aqueous phase of the electrolyte from the raffinate.

The following examples will serve to further illustrate the invention.

EXAMPLE I

A number of runs were carried out in which acrylonitrile was electrolytically hydrodimerized to adiponitrile. Several electrolyte compositions were used to demonstrate the effect each had upon the selectivity to the desired reaction.

The cell arrangement was similar to that shown in FIG. 1. The cell container was of about 1 liter capacity and was equipped with a side arm near the top which was suitable for continuously decanting the upper organic phase from the lower aqueous phase within the cell. The decanted organic phase was conducted to a phase separator, to permit minor amounts of entrained aqueous electrolyte solution to settle out, and most of the organic phase was recycled to the cell through the feed tube extending through the cathode. A minor portion of the organic phase was diverted from this recirculating stream and conducted to product recovery and/or analysis. Fresh acrylonitrile feed was blended with the recirculating organic phase just prior to introduction into the cell. Any aqueous electrolyte which was removed from the cell was returned to the cell together with sufficient make-up water and electrolyte salts to keep the aqueous electrolyte composition essentially constant within the cell. The cell was cooled internally by a cooling coil in the electrolyte.

The cathode comprised a smooth lead sheet of about 93 cm.$^2$ in surface area. The lead sheet was wrapped around a nonconducting, generally cylindrical plastic core having a diameter of about 3 cm. and slightly longer than the 9.5 cm. height of the lead sheet. A feed tube extended down through the center of the plastic core and terminated in a porous plastic sparger just beneath the core. A cylindrical lead anode surrounded the cathode and was spaced about ½ inch from the cathode. No divider or selective membrane was used between the electrodes.

The runs were carried out under essentially comparable conditions which included a current density of about 135 ma./cm.$^2$, a temperature of 95° F., and a recirculation rate, fresh feed rate, and product take-off rate to provide about 2 to 3 percent conversion per pass through the cathode and about a 25 percent net or total conversion based on the fresh feed rate.

The electrolyte was prepared by dissolving a suitable quantity of the desired salts in a suitable quantity of water. For example, an electrolyte which was about 1.5 N in Na$^+$ ion and about 0.2 N in tetraethylammonium$^+$ ion was prepared by dissolving 42 g. NaOH and 235 g. of a 10 weight percent tetraethylammonium hydroxide solution in water, adjusting the pH of the solution to about 7 by adding phosphoric acid, and adding sufficient water to make 700 g. of total solution. Other than hydroxyl ions, phosphate ions were the only anions present in the solution. The solubility of acrylonitrile in each of the electrolytes prepared (except in Run 5) was less than about 4.5 weight percent.

The cell voltages varied from about 5 to about 8 volts in these runs but were generally in the range of from about 5 to about 6 volts.

The results of these runs, in respect to the liquid cathode products, are shown in the following table. Except for elemental oxygen and traces of $CO_2$, there were no significant gaseous products formed. The data represent samples taken in the run when an approximately steady state was achieved, generally several hours after run startup. The results are shown in Table I below.

TABLE I.—CONVERSION OF ACRYLONITRILE TO ADIPONITRILE

| Run No. | Cation | Liquid products,[a] wt. percent | | | | Wt. ratio of adiponitrile to liquid by-products | | | Cation / ratio, Type (1)/ Type (2) |
|---|---|---|---|---|---|---|---|---|---|
| | | Adiponitrile | Propionitrile | Succinonitrile | Bis(2-cyanoethyl)ether | ADN/PN | ADN/SN | ADN/BCE | |
| 1 | Na$^+$ (1.5 N) | [b] 11 | 89 | 1 | | 0.12 | 11 | | |
| 2 | (Na$^+$ (1.5 N) (Tetraethylammonium$^+$ (0.2 N). | [b] 65 | 35 | 1 | | 1.9 | 65 | | 7.5 |
| 3 | (Na$^+$ (1.0 N) (Tetrapropylammonium$^+$ (0.1 N). | 82 | 15.2 | 2.3 | 0.5 | 5.4 | 36 | 164 | 10 |
| 4 | (Na$^+$ (1.5 N) (Tetrabutylammonium$^+$ (0.1 N). | 94.3 | 3.7 | 0.8 | 1.2 | 26 | 118 | 79 | 15 |
| 5 | Tetrabutylammonium$^+$ (0.5 N) [c] | (Found essentially inoperable in this system.) | | | | | | | |

[a] May have contained a small percent of 1,3,6-tricyanohexane.
[b] 5 layers of leaded 20 mesh copper wire screen used instead of smooth lead sheet on cathode.
[c] Tested with sulfate anion instead of phosphate.

The data in Runs 2, 3, and 4 show the surprisingly beneficial results obtained with a combination of electrolyte salts having both Type (1) and Type (2) cations in accordance with the invention. This is in specific contrast to the poor results obtained in Run 1 when using only the simple inorganic salt, sodium phosphate, which contained only Type (1) cations. Said data in Runs 2, 3, and 4 are also surprising when contrasted with the data in Run 5 obtained by use of an organic cation, such as the tetrabutylammonium ion (a Type (2) cation), as the sole cation, except for some hydrogen ions, in the electrolyte. Such an electrolyte is inoperable in the process of the invention because of the greater solubility of acrylonitrile in the electrolyte (greater than 5 weight percent). Such an electrolyte causes considerable acrylonitrile losses at the anode in the absence of a permselective membrane, and results in considerable succinonitrile formation in the region of the anode. Also, the high solubility of the organic salt in the organic liquids causes an intolerable amount of the salt to be carried out of the cell with the organic phase.

The combination, however, of a relatively small amount of a Type (2) cation and a relatively large amount of a Type (1) cation has been found to give the desired product with high selectivity, even in the absence of current-resisting permselective membranes, without the need for recirculating unnecessarily large volumes of aqueous electrolyte, and without the need for a complex separation system to recover and isolate the desired organic product and unreacted feedstock which are dissolved in large amounts of aqueous electrolyte. The above data also show the beneficial effect of increasing the number of carbon atoms in the alkyl groups of the quaternary tetraalkylammonium ions.

EXAMPLE II

In a manner similar to that of the previous example and using similar apparatus, acrylonitrile was converted to adiponitrile at a net conversion of 32.8 percent (based on fresh feed), at a current density of 135 ma./cm.$^2$, at a cell voltage of 5.4, at a temperature of 95° F., at a pH of 7, and at 12.5 amps. The electrolyte was 1.5 N in sodium phosphate, and sufficient tetrabutylammonium phosphate was added to provide a 1.3 weight percent concentration in the organic phase leaving the cell. Sufficient $H_3PO_4$-neutralized tetrabutylammonium hydroxide solution was added to the cell during the run to maintain that concentration. The cell was operated under liquid-full conditions. A two-phase mixture exited the cell and was separated into an aqueous phase and an organic phase. The aqueous electrolyte phase was cooled before being returned to the cell. The organic phase was processed as in Example I.

Both the gaseous and the liquid products from the cell were sampled and analyzed. The gaseous products consisted of 86.3 mol percent $O_2$, 13.7 mol percent $CO_2$, and a trace of hydrogen. The yield of products, based on acrylonitrile reacted, is shown in the following Table II.

TABLE II

|  | Yield,[1] percent of acrylonitrile reacted |
|---|---|
| Adiponitrile | 92.4 |
| Propionitrile | 4.6 |
| Succinonitrile | 1.2 |
| Bis(2-cyanoethyl)ether | 0 |
| $CO_2$ | 1.8 |
|  | 100.0 |

|  | Wt. ratio of adiponitrile to liquid by-products |
|---|---|
| ADN/PN | 20 |
| ADN/SN | 77 |
| ADN/BCE | (2) |

[1] May have contained a small percent of 1,3,6-tricyanohexane.
[2] No ether observed.

The above data show that high efficiency to the desired adiponitrile product can be obtained under still another set of operating conditions within the scope of the present invention.

EXAMPLE III

In another series of runs, several other Type (2) cations, in relatively low concentrations, were tested in an emulsion system. The cell comprised an anode and a cathode in the form of 1 x 9 inch rectangular lead plates which were 1/8 inch in thickness. These electrodes were vertically positioned in a holder and cell such that there was a 3/16 inch space between them. The cell had a feed inlet near the bottom and an outlet near the top. The cell was operated under liquid-full conditions by continuously circulating a mixture of emulsified aqueous electrolyte and acrylonitrile through the cell from bottom to top. The emulsification was accomplished by means of the circulating pump.

The operating conditions included a cell voltage of 5.8 to 6.0 volts, a current density of 200 amp/sq. ft., a reaction temperature of 100 to 130° F., an organic phase loading or concentration in the emulsion of 6 to 12 weight percent based on the total circulating emulsion, a linear velocity of 0.5 ft. per second in the cell, and an acrylonitrile conversion per pass of 0.6 to 1.2 percent. A typical initial charge to the circulating system consisted of 190–400 g. of 1.5 N sodium added as sodium phosphate, about 27 to 41 g. of acrylonitrile, depending upon the organic loading desired, and about 0.1 to 0.5 g. (about 0.4–1.9 weight percent with respect to the acrylonitrile) of a Type II cation-containing salt. The circulation and electrolytic conversion was continued for about 30 minutes and the acrylonitrile was near 50 percent converted. The organic phase of the reaction mixtures were then analyzed. The results of these runs are shown in the following Table III.

TABLE III

| Run number | 1 | 2 | 3 | 4 | 5 | 6 | 7 |
|---|---|---|---|---|---|---|---|
| Type (2) salt | TBMAMS | TBEAES | TMOAMS | TMBAMS | 6HHTMAMS | HMB(TMA)MS | HMB(ODMA)P |
| Type (2) salt concentration, wt. percent a | 1.9 | 1.9 | 1.9 | 1.9 | 1.9 | 1.9 | 1.9 |
| Type (2) cation, normality | 0.0042 | 0.0039 | 0.0045 | 0.0059 | 0.0057 | 0.0064 | 0.0084 |
| Normality ratio, Type (1)/Type (2) | 360 | 380 | 330 | 250 | 260 | 230 | 180 |
| Temperature, ° F | 100 | 100 | 100 | 100 | 100 | 100 | 100 |
| Organic phase loading, wt. percent | 6 | 6 | 6 | 6 | 6 | 6 | 6 |
| Conversion, percent | 47.4 | 47.4 | 42.2 | 29.4 | 47.4 | 32.4 | 47.5 |
| Product distribution,d wt. percent: |  |  |  |  |  |  |  |
| Adiponitrile (ADN) | 96.91 | 98.79 | 98.13 | 7.51 | 6.6 | 14.9 | 87.64 |
| Propionitrile (PN) | 2.59 | 0.72 | 1.69 | 92.41 | 93.4 | 85.1 | 12.28 |
| Succinonitrile (SN) | 0.49 | 0.49 | 0.18 | (e) | (e) | (e) | (e) |
| Wt. ratio of ADN to liquid by-products: |  |  |  |  |  |  |  |
| ADN/PN | 37 | 137 | 58 | 0.08 | 0.08 | 0.18 | 7.1 |
| ADN/SN | 200 | 200 | 540 | (e) | (e) | (e) | 1,100 |
| Selectivity to ADN, percent d | 96 | 98 | 98 | 7 | 6 | 14 | 87 |

See footnotes at end of table.

TABLE III—Continued

| Run number | 8 | 9 | 10 | 11 | 12 | 13 | 14 | 15 |
|---|---|---|---|---|---|---|---|---|
| Type (2) salt | TBEAES | TBEAES | TBEAES | TBMAMS | TBEAES | MYTAB | ADMBAC | TBEAES |
| Type (2) salt concentration, wt. percent [a] | 0.46 | 0.46 | 0.46 | 1.9 | 1.0 | 1.0 | 1.0 | 1.9 |
| Type (2) cation, normality | 0.00094 | 0.0016 | 0.0013 | 0.0085 | 0.0020 | 0.0020 | 0.0020 | 0.0039 |
| Normality ratio, Type (1)/Type (2) | 1,500 | 940 | 1,200 | 170 | 750 | 750 | 750 | 380 |
| Temperature, °F | 100 | 100 | 100 | 100 | 130 | 100 | 120 | 120 |
| Organic phase loading, wt. percent | 6 | 10 | [b] 8 | 12 | 6 | 6 | 6 | [c] 6 |
| Conversion, percent | 43.0 | 37.1 | 43.5 | 41.3 | 56.3 | 39.7 | 47.9 | 46.5 |
| Product distribution,[d] wt. percent: | | | | | | | | |
| Adiponitrile (ADN) | 96.8 | 94.7 | 92.2 | 97.2 | 97.6 | 79.0 | 90.7 | 97.6 |
| Propionitrile (PN) | 3.1 | 4.7 | 7.7 | 2.7 | 2.1 | 20.9 | 8.9 | 2.2 |
| Succinonitrile (SN) | 0.1 | 0.4 | 0.1 | 0.1 | 0.3 | 0.1 | 0.4 | 0.2 |
| Wt. ratio of ADN to liquid by-products: | | | | | | | | |
| ADN/PN | 31 | 22 | 12 | 36 | 47 | 3.8 | 11 | 43 |
| ADN/SN | 970 | 240 | 920 | 970 | 330 | 790 | 230 | 490 |
| Selectivity to ADN, percent [d] | 96 | 94 | 92 | 97 | 97 | 79 | 90 | 97 |

[a] Based on weight of organic phase in the initial charge.
[b] Cell voltage increased to about 8.1 volts and current density increased to 300 amp/sq. ft.
[c] Used similar cell with ⅛ inch gap. Linear velocity was about 1 ft./sec.
[d] Data normalized on basis of the reported products; 1,3,6-tricyanohexane was not analyzed for in these runs and a small percentage may have been present.
[e] No succinonitrile was observed.

NOTE.—Type (2) salt key: TBMAMS=tributylmethylammonium methylsulfate; TBEAES=tributylethylammonium ethylsulfate; TMOAMS=trimethyloctylammonium methylsulfate; TMBAMS=trimethylbutylammonium methylsulfate; 6HHTMAMS=6-hydroxyhexyltrimethylammonium methylsulfate; HMB(TMA)MS=hexamethylenebis(trimethylammonium) methylsulfate; HMB(ODMA)P=hexamethylenebis(octyldimethylammonium) phosphate; MYTAB=myristyltrimethylammonium bromide; ADMBAC=alkyldimethylbenzylammonium chloride (alkyl portion is about 65% $C_{12}$, 25% $C_{14}$, and 10% $C_{16}$); TBAP=tetrabutylammonium phosphate.

The runs shown in Table III illustrate the fact that a number of different Type (2) cations are operable and useful in the present invention process. No measurable amounts of polymer or ether by-products were found in the effluents of these runs, most of which exhibited a very high selectivity to the desired adiponitrile. Runs 8–10 illustrate that only extremely small quantities of the Type (2) salt are required. The data also show that, while operable, not all Type (2) quaternary ammonium cations are equivalent, the preferred cations providing much more selectivity than others less preferred.

EXAMPLE IV

In a manner closely analogous to that of Example III, and using the same cell, electrodes, and equipment, another series of acrylonitrile conversion runs was carried out for the purpose of determining the effect of the anion of the Type (2) cation-containing salt. The operating conditions included a cell voltage of 5.1 to 5.4 volts, a current density of 200 amp/sq. ft., a reaction temperature of 120° F., an organic phase loading of 6.5 weight percent based on the total circulating emulsion, a linear velocity through the cell of 6 to 7 inches/sec., and the amount of Type (2) cation-containing salt present was 1 weight percent with respect to the organic phase. In each of the runs the normality of the tetrabutylammonium ion (TBA) was about 0.003 and the normality ratio of Na+/TBA+ was 500.

The various Type (2) cation-containing salts were prepared by neutralizing tetrabutylammonium hydroxide, to a pH of 7, with phosphoric acid, p-toluenesulfonic acid, acetic acid, and hydrochloric acid, respectively.

After the acrylonitrile, the specific Type (2) cation-containing salt, and the 1.5 N sodium phosphate solution were combined and recirculated through the cell as a milky-appearing emulsion, the electrical power was applied for about 30 minutes during which time the acrylonitrile was about 50 percent converted. The organic portion of the stream from each run was then allowed to separate and was then analyzed for products. The results are shown in Table IV.

TABLE IV

| Run Number | 1 | 2 | 3 | 4 | 5 |
|---|---|---|---|---|---|
| Type (2) salt cation | [a] | [a] | [a] | [a] | [a] |
| Anion | [b] | [b] | [c] | [d] | [e] |
| Conversion, percent | 55.2 | 47.9 | 48.9 | 50.1 | 51.1 |
| Product distribution,[f] wt. percent: | | | | | |
| Adiponitrile (ADN) | 96.4 | 97.2 | 97.7 | 97.9 | 98.0 |
| Propionitrile (PN) | 3.0 | 2.3 | 1.4 | 1.4 | 1.3 |
| Succinonitrile (SN) | 0.6 | 0.5 | 0.9 | 0.7 | 0.7 |

See footnotes at end of table.

TABLE IV—Continued

| Run number | 1 | 2 | 3 | 4 | 5 |
|---|---|---|---|---|---|
| Wt. ratio of ADN to liquid by-products: | | | | | |
| ADN/PN | 32 | 42 | 70 | 70 | 75 |
| ADN/SN | 160 | 190 | 110 | 140 | 140 |
| Selectivity to ADN, percent [f] | 96 | 97 | 98 | 98 | 98 |

[a] Tetrabutylammonium cation.
[b] Phosphate.
[c] p-Toluenesulfonate.
[d] Acetate.
[e] Chloride.
[f] May have contained a small percent of 1,3,6-tricyanohexane which was not analyzed for in these runs; data normalized on basis of the reported products.

The data of Table IV show that the most important aspect of a Type (2) cation-containing salt is the cation itself; the anion which accompanies the cation in its undissociated state appears to be of little or no consequence when used according to the process of the present invention. In the small amounts in which they are present, the relatively bulky or relatively small organic anions, and the relatively bulky or the small inorganic anions, all appear to give the same result. The high concentration of aqueous Type (1) cation-containing sodium phosphate in the system was sufficient to provide the necessary conductivity and the necessary two-phase system with the organic and the aqueous components. The very small concentration of the Type (2) cation was sufficient to supply the catalytic or directing effect which resulted in the high selectivity to the desired adiponitrile.

EXAMPLE V

A series of runs was carried out in which the amount of Type II salt was varied and the effect on the hydrodimerization of acrylonitrile was noted.

The cell was similar to that of Example III and was essentially like that illustrated in FIGS. 2 and 3. Two 1 x 9 inch rectangular lead plates, ⅛ inch in thickness, were vertically positioned as electrodes in the cell such that there was a ⅛ inch gap between them.

The procedure was also similar to that of Example III. The initial charge to the circulating emulsion system for each run contained 1500 g. of 1.5 molar potassium ions prepared from KOH and phosphoric acid and adjusted to a pH 7.0. To this solution, having a density of 1.10, was added 55 g. of acrylonitrile to give an organic loading of 3.54 wt. percent. To this system was also added varying amounts of the Type (2) cation-containing salt, added as tetrabutylammonium hydroxide, but calculated at weight percent of the cation only.

Typical cell voltages in the series were 4.2–4.5 volts and the current density was 200 ma./cm.$^2$. The temperature was about 120° F. The recirculation rate was about 1500 g./minute and the linear velocity in the cell was about 1 foot/sec. Each run was continued long enough to provide 0.5 Faraday per mol of acrylonitrile (a nominal 50% conversion of acrylonitrile). Analysis of the reaction mixture from each run by gas-liquid chromatography provided the data shown in Table V.

loading levels, for example from about 3 to about 7 wt. percent, give excellent results. However, still higher loadings, for example higher than about 7 wt. percent, show a trend toward lower selectivities again. These conclusions are also supported by Runs 10–17 of Section B wherein the concentration of the tetrabutylammonium ion was much greater.

TABLE VI

| Run number | Section A: 0.04 wt. percent n-Bu₄N⁺ (0.0018 N) | | | | | | | | | Section B: 0.40 wt. percent n-Bu₄N⁺ (0.018 N) | | | | | | | |
|---|---|---|---|---|---|---|---|---|---|---|---|---|---|---|---|---|---|
| | 1 | 2 | 3 [b] | 4 [a] | 5 | 6 [c] | 7 [i] | 8 [i] | 9 [i] | 10 [d] | 11 | 12 | 13 [e] | 14 [e] | 15 [f] | 16 [f] | 17 [g] |
| Organic loading, wt. percent | 2.28 | 2.90 | 3.22 | 3.54 | 4.15 | 5.87 | 6.3 | 7.7 | 9.3 | 2.46 | 2.90 | 3.54 | 4.16 | 4.20 | 4.78 | 4.80 | 5.75 |
| Conversion, percent | 51.7 | 47.4 | (50) | 51.1 | 48.8 | 49.1 | 81.3 | 74.0 | 68.6 | 22 | 52.0 | 51.8 | 51.7 | 52.6 | 53.3 | 51.9 | 22.9 |
| Product distribution, wt. percent: | | | | | | | | | | | | | | | | | |
| Adiponitrile (ADN) | 61.7 | 87.5 | 89.4 | 90.5 | 89.9 | 89.6 | 92.2 | 89.7 | 85.4 | 33.4 | 87.0 | 91.3 | 93.3 | 94.3 | 90.0 | 91.0 | 87.3 |
| Propionitrile (PN) | 36.9 | 10.2 | 7.2 | 3.6 | 3.2 | 1.2 | 2.5 | 5.1 | 9.5 | 59.1 | 7.3 | 5.8 | 1.5 | 0.1 | 0.7 | 1.0 | 0.2 |
| 1,3,6-tricyanohexane (trimer) | 1.0 | 2.1 | 3.2 | 5.3 | 6.7 | 9.0 | 4.5 | 4.4 | 4.5 | | 4.1 | 3.0 | 5.2 | 5.6 | 8.3 | 7.6 | 8.8 |
| Others | 0.4 | 0.2 | 0.2 | 0.6 | 0.2 | 0.2 | 0.8 | 0.8 | 0.6 | 7.5 | 1.6 | Nil | Nil | Nil | 1.0 | 0.4 | [h] 3.7 |
| Weight ratio of ADN to liquid by-products: | | | | | | | | | | | | | | | | | |
| ADN/PN | 1.7 | 8.6 | 12 | 25 | 28 | 15 | 27 | 18 | 9 | 0.56 | 12 | 16 | 62 | 943 | 130 | 91 | 440 |
| ADN/Trimer | 62 | 42 | 28 | 17 | 13 | 10 | 20 | 20 | 19 | | 21 | 31 | 18 | 17 | 11 | 12 | 9.9 |
| ADN/others | 150 | 440 | 450 | 150 | 450 | 450 | 110 | 110 | 140 | 4.3 | 54 | | | | 90 | 230 | 24 |

[a] Average of three runs.
[b] Analytical difficulty in calculating acrylonitrile peak. Hence, conversion is estimated.
[c] 0.08 wt. percent n-Bu₄N⁺ (0.0036 N) in this run.
[d] "Others" probably included significant amounts of succinonitrile.
[e] Small trace of polymer on cathode.
[f] Polymer present along edge of cathode in appreciable amounts.
[g] Gross amount of polymer formation caused premature termination of run.
[h] "Others" included 2.3 wt. percent hydroxypropionitrile and 1.4 wt. percent bis-2-cyanoethylether.
[i] These Runs 7–9 were carried out similarly to the preceding except that they were continuous in that an organic product was continuously withdrawn, fresh acrylonitrile was continuously fed, and make-up Type (2) salt was intermittently added. The level of n-Bu₄N⁺ was about 0.75 wt. percent based on the organic portion of the system and corresponded to about 0.03 wt. percent based on the aqueous portion. Each run is an average of three.

These data show that extremely small tetrabutylammonium ion concentrations are very effective in the process of the present invention.

In the above runs it was observed that in those runs where the organic loading was less than about 3 wt. percent, the circulating electrolytes were single-phase sys-

TABLE V

| Run number | 1 | 2 | 3 | 4 [a] | 5 [a] | 6 | 7 |
|---|---|---|---|---|---|---|---|
| n-Bu₄N⁺, wt. percent | 0.01 | 0.013 | 0.02 | 0.04 | 0.067 | 0.10 | 0.4 |
| n-Bu₄N⁺, normality | 0.00045 | 0.00059 | 0.00091 | 0.0018 | 0.0030 | 0.0045 | 0.018 |
| Normality ratio, K⁺/n-Bu₄N⁺ | 3,300 | 2,500 | 1,600 | 830 | 500 | 330 | 83 |
| Organic loading, wt. percent | 3.54 | 3.54 | 3.54 | 3.54 | 3.54 | 3.54 | 3.54 |
| Conversion, percent | 47.2 | 49.5 | 50.2 | 51.1 | 50.3 | 49.5 | 51.8 |
| Product distribution, wt. percent: | | | | | | | |
| Adiponitrile (ADN) | 79.2 | 80.9 | 90.7 | 90.5 | 91.4 | 91.6 | 91.3 |
| Propionitrile (PN) | 15.4 | 14.2 | 4.4 | 3.6 | 4.6 | 4.0 | 5.8 |
| 1,3,6-tricyanohexane (trimer) | 5.1 | 4.4 | 4.6 | 5.3 | 3.3 | 3.5 | 3.0 |
| Others | 0.3 | 0.5 | 0.3 | 0.6 | 0.7 | 0.8 | |
| Weight ratio of ADN to liquid by-products: | | | | | | | |
| ADN/PN | 5.1 | 5.7 | 21 | 25 | 20 | 23 | 16 |
| ADN/trimer | 15 | 18 | 20 | 17 | 28 | 26 | 30 |
| ADN/others | 260 | 160 | 300 | 150 | 130 | 110 | |

[a] Average of three runs.

EXAMPLE VI

Another series of acrylonitrile conversion runs was carried out in which the proportion of organic material (organic loading) in the circulating electrolytes, compared to the aqueous and inorganic material passing through the cell, was varied.

The cell, operating conditions, and procedure were essentially identical with that of Example V. In one set of runs the organic content of the system was varied while the concentration of tetrabutylammonium ion was 0.04 wt. percent (based on the 1500 g. of 1.5 N K⁺ solution). Thus, the normality of tetrabutylammonium ion was 0.0018 and the normality ratio K⁺/TBA⁺ was 830. In another set of runs, the concentration of tetrabutylammonium ion was 0.4 wt. percent, the normality was 0.018, and the normality ratio K⁺/TBA⁺ was 83.

For each individual run, a given amount of acrylonitrile was charged into a recirculating system of 1500 g. of the 1.5 N K⁺ (as phosphate) solution, which contained the stated amount of tetrabutylammonium ion, so as to give the stated percent organic loading, based on the total electrolyte system. The final reaction mixtures were analyzed by gas-liquid chromatography and the results are shown in Table VI.

Runs 1 to 10 of Section A of Table VI illustrate the importance of organic loading level in the invention process. Low loadings, such as below about 2.5 wt. percent in this system, result in lower selectivity to adiponitrile and high by-product formation. The intermediate tems. In those runs where the organic loading was greater than about 3 wt. percent, the circulating electrolytes were two-phase systems, i.e., an emulsion.

EXAMPLE VII

Several runs were carried out to illustrate the response of electrolyte systems using relatively high concentrations of a Type (2) salt, such as tetraethylammonium phosphate (TEAP), in the conversion of acrylonitrile using the low organic loadings of the present invention. Except for the low organic loading, a run (Run 1) was carried out which was similar to that of Run 1, Example 2 of Belgian Patent 734,090. The run was repeated at a higher current density level, see Run 2 in Table VII below.

The cell and general procedure of Examples V–VI were used. The initial charge of acrylonitrile in each of the runs was 4.16 wt. percent based on the total electrolyte mixture. The anode and cathode were both of lead. The linear velocity of the emulsion passing through the cell was 30 cm./sec. and the temperature was 49° C. (120° F.). Samples were taken at the point of 50% theoretical acrylonitrile conversion, based on production of adiponitrile only, and analyzed by gas-liquid chromatography.

For purposes of comparison, a run (Run 3) also within the scope of the present invention but using a preferred Type II salt, tetrabutylammonium phosphate (TBAP) at a lower level (0.4 wt. percent), is also shown in Table VII below.

The data in the Table VII show that tetraethylammonium phosphate is much less effective than the tetrabutylammonium phosphate when used in relatively high concentrations and when using the low organic loadings of the present invention. The data also show that the preferred Type (2) cations can be used at higher current densities with greater effectiveness than the less preferred Type (2) cations.

TABLE VII

| Run number | 1 | 2 | 3 |
|---|---|---|---|
| Organic loading, wt. percent | 4.16 | 4.16 | 4.16 |
| Type (2) cation | Et₄N+ | Et₄N+ | n-Bu₄N+ |
| Type (2) cation concentration [a] | 0.70 | 0.70 | 0.40 |
| Type (2) cation normality | 0.059 | 0.059 | 0.180 |
| Type (1) cation (K+), normality | 1.5 | 1.5 | 1.5 |
| Ratio, Type (1)/Type (2) | 25 | 25 | 83 |
| Temp., °F | 120 | 120 | 120 |
| pH | 8.40 | 8.40 | 7.00 |
| Current density, ma./cm.² | 79 | 200 | 200 |
| Voltage, volts | 3.9 | 5.0 | 4.2 |
| Conversion, percent | 43.7 | 39.3 | 51.7 |
| Product distribution, wt. percent: | | | |
|   Adiponitrile (ADN) | 79.1 | 65.7 | 93.3 |
|   Propionitrile (PN) | 19.9 | 33.5 | 1.5 |
|   1,3,6-tricyanohexane (trimer) | 1.0 | 0.8 | 5.2 |
|   Others | (b) | (b) | (b) |
| Weight ratio of ADN to liquid by-products: | | | |
|   ADN/PN | 4.0 | 2.0 | 62 |
|   ADN/trimer | 79 | 82 | 18 |
|   ADN/others | | | |
| Cell gas analysis, mol percent: | | | |
|   Oxygen | 96.0 | 85.0 | 94.0 |
|   Carbon dioxide | 2.7 | 1.9 | 5.7 |
|   Hydrogen | 1.3 | [c] 13.1 | 0.3 |

[a] In terms of grams of cation per 100 g. aqueous portion of charge. A 0.70 g./100 g. level is equivalent to 0.96 wt. percent of the salt [(C₂H₅)₄N]₂HPO₄ based on the aqueous portion.
[b] Nil.
[c] 7.5% of cathodic current is represented by hydrogen in this sample. Thus, current efficiency in this run is low compared with those of Runs 1 and 3 which approach 100%.

EXAMPLE VIII

A comparison run was carried out to show the undesirable results obtained when using an organic loading level outside the scope of the present invention.

Employing the apparatus and using the general procedure of Examples V–VII, a run (Run 1) was carried out in which acrylonitrile was converted using tetrabutylammonium ion as the Type (2) cation but with an organic loading of 33 weight percent. This run resembled closely that of Run 1, Example 2 in Belgian Patent 734,090 which used the same high organic loading level and the same level of tetraethylammonium ion. Because of the high acrylonitrile content in the system, it was convenient to carry the conversion to only about 29%. However, the results of the run were already apparent, particularly when compared to similar invention runs made at lower organic loading levels. See Run 2 carried out at 20% conversion and Run 3 carried out at 52% conversion. The results and essential conditions of these runs are shown in Table VIII below.

The data in Table VIII clearly show the undesirability of high organic loadings in systems containing a more effective Type (2) cation such as tetrabutylammonium ion. The selectivity to the desired adiponitrile was much lower with the high loading, and several by-products, which do not appear in the invention runs, began to be observed in the high loading run.

In actuality, the results of the high loading run are much poorer than the data indicate. The large quantity of acrylonitrile could not be completely emulsified in the system employing the equipment available, even at the relatively high recirculation rate and linear velocity used. The acrylonitrile tended to settle out in the less turbulent areas of the system and the organic loading of the mixture which actually passed through the cell was actually lower than 33 wt. percent. Had a full 33 wt. percent loading been accomplished, the selectivity to adiponitrile would have been lower, due primarily to a still greater formation of trimer (1,3,6-tricyanohexane).

TABLE VIII

| Run number | 1 | 2 | 3 |
|---|---|---|---|
| Organic loading, wt. percent | 33 | 3.54 | 3.54 |
| Type (2) cation | [a] | [a] | [a] |
| Type (2) cation concentration [b] | 0.7 | 0.4 | 0.4 |
| Type (2) cation normality | 0.032 | 0.018 | 0.018 |
| Type (1) cation (K+), normality | 1.5 | 1.5 | 1.5 |
| Ratio, Type (1)/Type (2) | 47 | 83 | 83 |
| Temp., °F | 120 | 120 | 120 |
| pH | 8.40 | 7.00 | 7.00 |
| Current density, ma./cm.² | 200 | 200 | 200 |
| Voltage, volts | 5.2 | 4.3 | 4.3 |
| Conversion, percent | 29 | 20 | 52 |
| Product distribution, wt. percent: | | | |
|   Adiponitrile (ADN) | 82.3 | 96.0 | 91.2 |
|   Propionitrile (PN) | 0.1 | 0.5 | 5.8 |
|   1,3,6-tricyanohexane (trimer) | 14.0 | 3.5 | 3.0 |
|   Succinonitrile (SN) | 1.9 | Nil | Nil |
|   β-Hydroxypropionitrile | 1.5 | Nil | Nil |
|   Others | [c] 0.2 | Nil | Nil |
| Weight ratio of ADN to liquid by-products: | | | |
|   ADN/PN | 823 | 190 | 16 |
|   ADN/trimer | 5.9 | 27 | 30 |
|   ADN/SN | 43 | | |
|   ADN/others | 48 | | |

[a] n-Bu₄N+.
[b] In terms of g. of cation per 100 g. aqueous portion of charge. A 0.7 g. level corresponds to 0.96 wt. percent of the salt [(C₂H₅)₄N]₂HPO₄ based on the aqueous portion.
[c] Small amount of solid polymer also observed.

The data in the above tables show that the process of the invention, using the electrolyte systems of the invention, is capable of reductively coupling olefinic reactants with high selectivity. For example, with acrylonitrile, selectivities to adiponitrile of at least 70 percent are easily obtained. Preferably, the process is operated to obtain selectivities of at least 85 percent, more preferably at least 90 percent.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. An electrolyte composition, suitable for use in electrochemical processes for the reductive coupling of reactants capable of being reductively coupled to a coupled reaction product, which comprises:

water;

first cations selected from the group (1) consisting of ions of the alkali metals, ions of the alkaline earth metals, ammonium ions, methyl-substituted ammonium ions, quaternary tetramethylammonium ions, and mixtures thereof, and which are present in a concentration sufficient for said electrolyte to be from 0.1 to 30 normal with respect thereto, based on the aqueous portion of said electrolyte;

second cations selected from the group (2) consisting of quaternary tetraalkylammonium ions, quaternary dialkylpiperidinium ions, quaternary dialkylpyrrolidinium ions, quaternary dialkylmorpholinium ions, trialkylsulfonium ions, tetraalkylphosphonium ions, tetraalkylarsonium ions, tetraalkylstibonium ions, quaternary di(alkylene)ammonium ions, and quaternary hexaalkyldiammonium ions having a $C_1$ to $C_5$ alkylene group joining the two nitrogen atoms, and mixtures thereof, wherein each alkyl group is selected from the group consisting of alkyl or cycloalkyl groups containing from 1 to 20 carbon atoms, aryl-substituted, alkenyl-substituted, mono- or dihydroxyl-substituted alkyl groups containing from 1 to 20 carbon atoms, wherein at least one alkyl group contains at least 2 carbon atoms, and wherein the total number of carbon atoms in the ion is not more than 40, and which are present in a concentration sufficient for said electrolyte to be from 0.0001 to 1 normal with respect thereto, based on the aqueous portion of said electrolyte; and anions which do not significantly increase the solubility of said reactant in the electrolyte;

from 2 to 12 weight percent of said reactant or said reactant and said product; and wherein
the normality ratio of said group (1) cations to said group (2) cations is at least 1.5.

2. An electrolyte composition according to claim 1 wherein the amount of said reactant or said reactant and said product is within the range of from about 3 to about 7 weight percent.

3. An electrolyte composition according to claim 1 wherein the amount of said reactant or said reactant and said product is within the range of from about 2.5 to about 10 weight percent.

4. An electrolyte composition according to claim 3 wherein said reactant is a nitrile selected from the group of nitriles represented by the formula

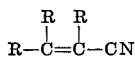

wherein each R is hydrogen or an alkyl group containing from 1 to 10 carbon atoms.

5. An electrolyte composition according to claim 4 wherein:
said first cations are selected from the alkali metal ions, and mixtures thereof; and
said second cations are selected from the group represented by the formula

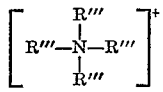

wherein: each R''' is selected from the group consisting of alkyl radicals, cycloalkyl radicals, alkenyl radicals, aralkyl radicals, and monohydroxy-substituted alkyl radicals containing from 1 to about 20 carbon atoms per radical, at least one R''' is an alkyl radical containing at least 2 carbon atoms, and the total number of carbon atoms in all the R''' radicals is not more than about 40.

6. An electrolyte composition according to claim 5 wherein:
at least one of said R''' radicals is an alkyl radical containing at least 4 carbon atoms; and
the total number of carbon atoms in all of said R''' radicals is at least 11.

7. An electrolyte composition according to claim 4 wherein said reactant is acrylonitrile.

8. An electrolyte composition according to claim 4 wherein said second cations are selected from the group consisting of quaternary tetrapropylammonium ions, quaternary tetrabutylammonium ions, quaternary tributylmethylammonium ions, quaternary tributylethylammonium ions, quaternary trimethyloctylammonium ions, quaternary hexamethylenebis(octyldimethylammonium) ions, quaternary dimethylbenzylammonium ions, and quaternary myristyltrimethylammonium ions, and mixtures thereof.

9. A process for the electrolytic reductive coupling of a nitrile reactant to a coupled reaction product in an electrolytic cell provided with a cathode and an anode, said nitrile being selected from the group consisting of nitriles represented by the formula

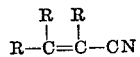

wherein each R is hydrogen or an alkyl group containing from 1 to 10 carbon atoms, which process comprises:
passing a direct electric current through an aqueous mixed salt electrolyte containing water, first cations which decrease the solubility of said reactant in said electrolyte, second cations which direct the reductive coupling of said reactant in said electrolyte, all of said cations being stable to decomposition at said cathode or said anode, anions which do not significantly increase the solubility of said reactant in said electrolyte and which do not interfere with said reductive coupling, and from 2 to 12 weight percent of said reactant or said reactant and said product; and
during said passage of said electric current, converting at least a portion of said reactant to said reaction product.

10. A process according to claim 9 wherein the amount of said reactant or said reactant and said product is within the range of from about 2.5 to about 10 weight percent.

11. A process according to claim 10 wherein said reactant is acrylonitrile.

12. A process according to claim 10 wherein: the concentration of said first cations in said electrolyte is within the range of from about 0.1 to about 30 normal, based on the aqueous portion thereof; the concentration of said second cations in said electrolyte is within the range of from 0.0001 to about 1 normal, based on the aqueous portion thereof; and the normality ratio of said first cations to said second cations is at least 1.5.

13. A process according to claim 12 wherein:
said first cations are selected from the group consisting of ions of the alkali metals, ions of the alkaline earth metals, ammonium ions, methyl-substituted ammonium ions, quaternary tetramethylammonium ions, and mixtures thereof; and
said second cations are selected from the group consisting of quaternary tetraalkylammonium ions, quaternary dialkylpiperidinium ions, quaternary dialkylpyrrolidinium ions, quaternary dialkylmorpholinium ions, trialkylsulfonium ions, tetraalkylphosphonium ions, tetraalkylarsonium ions, tetraalkylstilbonium ions, quaternary di(alkylene) ammonium ions, and quaternary hexaalkyldiammonium ions having a $C_1$ to $C_5$ alkylene group joining the two nitrogen atoms, and mixtures thereof, wherein each alkyl group is selected from the group consisting of alkyl or cycloalkyl groups containing from 1 to 20 carbon atoms, aryl-substituted, alkenyl-substituted, or mono- or dihydroxy-substituted groups containing from 1 to 20 carbon atoms, wherein at least one alkyl group contains at least 2 or more carbon atoms, and wherein the total number of carbon atoms in the ion is not more than 40.

14. A process according to claim 13 wherein said second cations are selected from the group represented by the formula

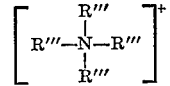

wherein: each R''' is selected from the group consisting of alkyl radicals, cycloalkyl radicals, alkenyl radicals, aralkyl radicals, and monohydroxy-substituted alkyl radicals containing from 1 to about 20 carbon atoms per radical, at least one R''' is an alkyl radical containing at least 2 carbon atoms, and the total number of carbon atoms in all the R''' radicals is not more than about 40.

15. A process according to claim 14 wherein:
said first cations are either sodium or potassium ions, or a mixture thereof;
said second cations comprise quaternary tetrabutylammonium ions;
said anions comprise trivalent phosphate ions; and
said olefinic reactant is acrylonitrile.

16. A process according to claim 9 wherein the amount of said reactant or said reactant and said product is within the range of from about 3 to about 7 weight percent.

17. A process according to claim 16 wherein:
said olefinic reactant is selected from the group consisting of nitriles represented by the formula

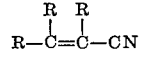

wherein each R is hydrogen or an alkyl group containing from 1 to 5 carbon atoms;

said first cations are either sodium ions, potassium ions, or a mixture thereof;

said second cations are selected from the group consisting of quaternary tetrapropylammonium ions, quaternary tetrabutylammonium ions, quaternary tributylmethylammonium ions, quaternary tributylethylammonium ions, quaternary trimethyloctylammonium ions, quaternary hexamethylenebis(octyldimethylammonium) ions, quaternary dimethylbenzylammonium ions, and quaternary myristyltrimethylammonium ions, and mixtures thereof; and said anions comprise trivalent phosphate ions.

18. A process according to claim 17 wherein the solubility of said olefinic reactant in said electrolyte is less than 5 weight percent.

19. A process according to claim 17 wherein said olefinic reactant is acrylonitrile and said reaction product is adiponitrile.

20. A process according to claim 9 wherein said electrolyte consists essentially of a single aqueous phase and contains less than about 5 weight percent of said reactant or said reactant and said product in solution therein.

21. A process according to claim 20 wherein:
said first cations are selected from the group consisting of ions of the alkali metals, ions to the alkaline earth metals, ammonium ions, methyl-substituted ammonium ions, quaternary tetramethylammonium ions, and mixtures thereof;
said second cations are selected from the group represented by the formula

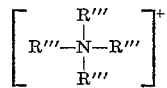

wherein: each R''' is selected from the group consisting of alkyl radicals, cycloalkyl radicals, alkenyl radicals, aralkyl radicals, and monohydroxy-substituted alkyl radicals containing from 1 to about 20 carbon atoms per radical, at least one R''' is an alkyl radical containing at least 2 carbon atoms, and the total number of carbon atoms in all the R''' radicals is not more than about 40; and said olefinic reactant is selected from the group consisting of nitriles represented by the formula

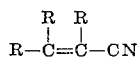

wherein each R is hydrogen or an alkyl group containing from 1 to 5 carbon atoms.

22. A process according to claim 9 wherein:
said electrolyte is an emulsion comprising said olefinic reactant, is passed through said cell between said cathode and said anode, and said current is passed through said emulsion;
a cell effluent stream comprising said emulsion and said reaction product is withdrawn from said cell; and
said reaction product is recovered from said cell effluent.

23. A process according to claim 22 wherein said emulsion comprises from about 2.5 to about 10 weight percent of organic phase.

24. A process according to claim 22 wherein said reactant is acrylonitrile.

25. A process according to claim 24 wherein: the concentration of said first cations in said electrolyte is within the range of from about 0.1 to about 3 normal, based on the aqueous portion thereof; the concentration of said second cations in said electrolyte is within the range of from about 0.001 to about 0.01 normal, based on the aqueous portion thereof; and the normality ratio of said first cations to said second cations is at least 1.5.

26. A process according to claim 23 wherein: said second cations are selected from the group represented by the formula

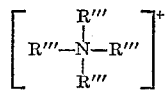

wherein: each R''' is selected from the group consisting of alkyl radicals, cycloalkyl radicals, alkenyl radicals, aralkyl radicals, and monohydroxy-substituted alkyl radicals containing from 1 to about 20 carbon atoms per radical, at least one R''' is an alkyl radical containing at least 2 carbon atoms, and the total number of carbon atoms in all the R''' radicals is not more than about 40.

27. A process according to claim 23 wherein:
said emulsion is introduced into said cell in a region adjacent the lower end of said electrodes and flows upwardly therebetween at a linear velocity sufficient to inhibit the formation of a film of organic material on the surface of said cathode; and
said cell effluent stream is withdrawn from the upper portion of said cell, and also comprises organic salt of said second cations in an amount within the range of from 0.05 to 12 weight percent of said organic phase.

28. A process according to claim 27 wherein:
the linear velocity of said emulsion flowing between said electrodes is within the range of from 0.05 to about 6 feet per second;
said emulsion comprises from about 3 to about 7 weight percent of organic phase;
said organic salt of said second cations is included in said emulsion in an amount sufficient to maintain the concentration there of in said cell effluent stream within the range of from 0.05 to 2 weight percent of said organic phase;
said first cations are either sodium ions, or potassium ions, or a mixture thereof;
said second cations are selected from the group consisting of quaternary tetrapropylammonium ions, quaternary tetrabutylammonium ions, quaternary tributylmethylammonium ions, quaternary tributylethylammonium ions, quaternary trimethyloctylammonium ions, quaternary hexamethylenebis(octyldimethylammonium) ions, quaternary dimethylbenzylammonium ions, and quaternary myristyltrimethylammonium ions, and mixtures thereof;
said anions comprise trivalent phosphate ions;
said olefinic reactant is acrylonitrile; and
said reaction product is adiponitrile.

29. A process according to claim 21 wherein said emulsion comprises a discontinuous phase of said reactant dispersed in a continuous phase of said water.

30. A process according to claim 29 wherein said reactant is acrylonitrile.

31. A process according to claim 22 wherein said emulsion comprises from about 3 to about 7 weight percent organic phase.

References Cited

UNITED STATES PATENTS

| | | | |
|---|---|---|---|
| 3,193,482 | 7/1965 | Baizer | 204—73 A X |
| 3,458,559 | 7/1969 | Holland et al. | 204—73 A X |
| 3,267,131 | 8/1966 | Campbell et al. | 204—73 A X |
| 3,477,923 | 11/1969 | Beck et al. | 204—73 A |

FOREIGN PATENTS

| | | | |
|---|---|---|---|
| 813,877 | 5/1969 | Canada | 204—73 A |

F. C. EDMUNDSON, Primary Examiner

U.S. Cl. X.R.

204—73 R, 237

UNITED STATES PATENT OFFICE

CERTIFICATE OF CORRECTION

Patent No. 3,689,382                                Dated: September 5, 1972

Homer M. Fox et al

It is certified that error appears in the above-identified patent and that said Letters Patent are hereby corrected as shown below:

In the drawings, in the heading, Sheet 1 and Sheet 2, delete "H. N. Fox et al" and insert therefor —— H. M. Fox et al ——;

In the drawings, in the lower right-hand corner, Sheet 1 and Sheet 2, delete "H. N. Fox" and insert —— H. M. Fox ——;

Column 1, line 3, delete "Homer N. Fox" and insert therefor —— Homer M. Fox ——;

Column 1, line 4, delete "Huyck Corporation, Rensselaer, N.Y." and insert therefor —— Phillips Petroleum Company, Bartlesville, Oklahoma ——;

Column 27, line 25, delete "to" and insert therefor —— of ——;

Column 27, line 63, delete the numeral "22" and insert therefor —— 23 ——;

Column 28, line 34, delete "there of" and insert therefor —— thereof ——; and

Column 28, line 51, delete the numeral "21" and insert therefor —— 22 ——.

Signed and sealed this 13th day of March 1973.

(SEAL)
Attest:

EDWARD M. FLETCHER, JR.                          ROBERT GOTTSCHALK
Attesting Officer                                    Commissioner of Patents